March 9, 1937.  E. R. FITZGERALD  2,073,516
REFRIGERATING SYSTEM
Filed June 15, 1933
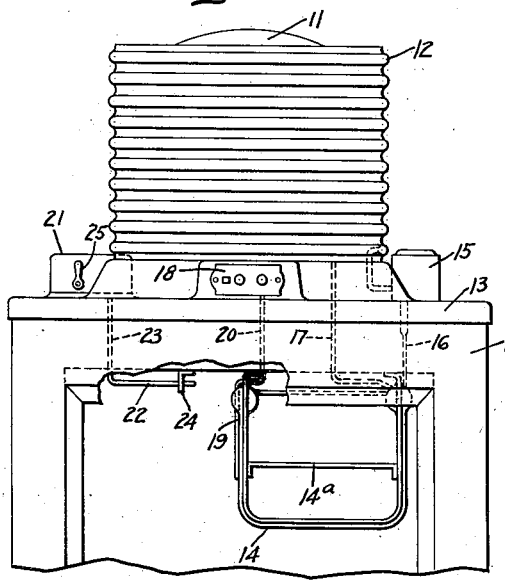
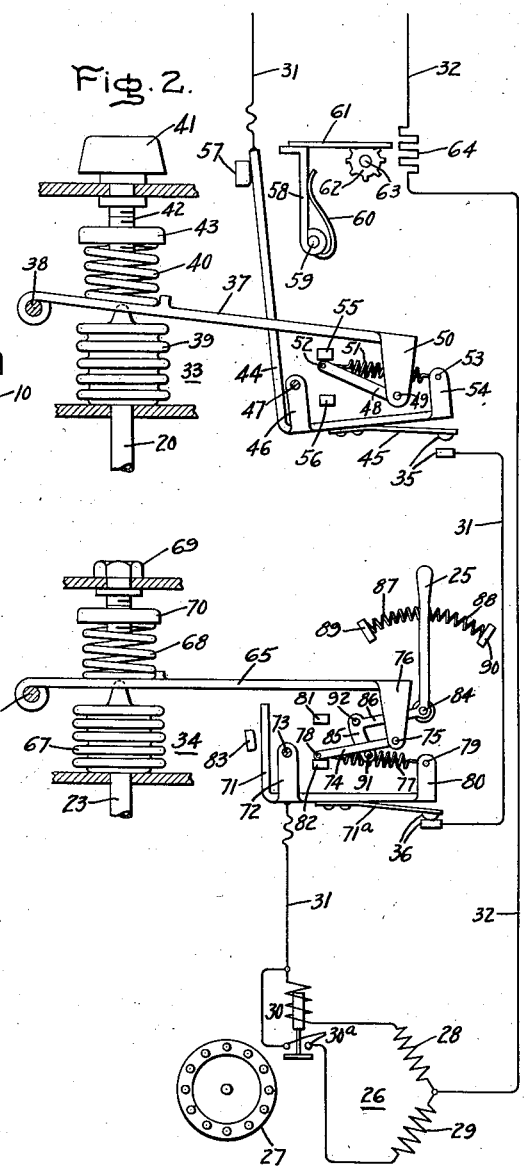
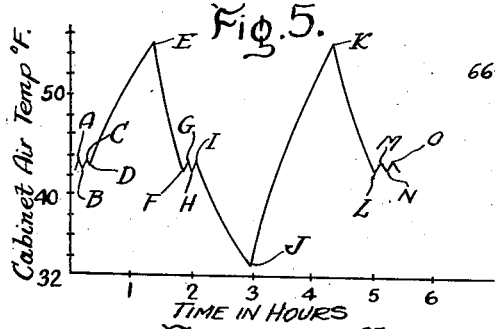
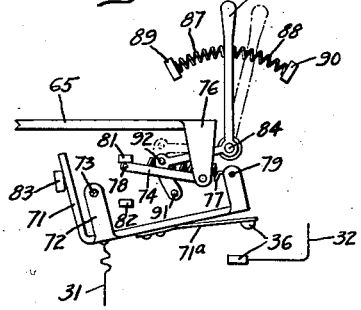
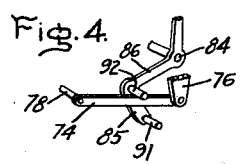
Inventor:
Edward R. Fitzgerald,
by Harry E. Dunham
His Attorney.

Patented Mar. 9, 1937

2,073,516

UNITED STATES PATENT OFFICE 2,073,516

REFRIGERATING SYSTEM

Edward R. Fitzgerald, Rexford, N. Y., assignor to General Electric Company, a corporation of New York Application June 15, 1933, Serial No. 675,930

13 Claims. (Cl. 62—4)

My invention relates to an arrangement for controlling the operation of refrigerating systems.

Refrigerating systems are controlled by temperature responsive devices which maintain the cooling unit or evaporator within a predetermined range of temperature, which is usually below freezing, the control device operating to stop the operation of the system at the lower end of the temperature range and to start the operation of the system again when the temperature of the evaporator has reached the upper temperature limit. During the operation of the system in this manner a coating of frost is formed on the evaporator by the freezing of moisture condensed on the evaporator from the surrounding air. This frost, if it is permitted to get too thick, constitutes a layer of insulation about the evaporator and reduces the transfer of heat to the evaporator from the chamber to be cooled, and frost may also be formed in sufficient quantity to obstruct circulation of air in the chamber about the evaporator. For these reasons it is occasionally necessary to stop the operation of the refrigerating system until the frost has been removed or melted in order to maintain normal efficiency of the evaporator.

Occasionally during the operation of refrigerating systems employing an electrical circuit which is opened and closed automatically to control the refrigerating system, the electrical contacts in the circuit become "frozen" together, or are in some other manner prevented from opening. Should the contacts be prevented from opening, the refrigerating system will not be stopped when the lower end of the temperature range has been reached, and consequently the evaporator and the cabinet will be cooled below the desired temperature and food within the cabinet may be frozen. Food in the cabinet may also be frozen if the refrigerating machine should be set for quick freezing of desserts or the like and the operator should forget to set the control back to normal, the machine then operating for a prolonged time at temperatures below normal.

It is an object of my invention to provide a refrigerating system operating within a predetermined range of temperature and having an arrangement operable at will to defrost the evaporator or cooling unit by stopping the refrigerating system, and which shall automatically restore the normal operation of the system when a predetermined maximum temperature has been reached in the chamber to be cooled.

Another object of my invention is to provide a refrigerating system operating between predetermined maximum and minimum temperatures and having an auxiliary mechanism for automatically stopping the operation of the system to prevent freezing of the contents of the chamber being cooled by the system in the event that the normal control should fail to stop the operation of the system when the minimum temperature is reached or should be set for too low a temperature of the chamber.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing, in which Fig. 1 is a front elevation of a refrigerator cabinet provided with a refrigerating system embodying my invention; Fig. 2 is a schematic diagram of the circuit control employed in the refrigerating system shown in Fig. 1; Fig. 3 is a view of a portion of the auxiliary mechanism shown in Fig. 2, with the switch contacts open; Fig. 4 is a perspective view of a portion of the auxiliary mechanism shown in Figs. 2 and 3; and Fig. 5 is a graph showing the operating characteristics of the control mechanism shown in Figs. 1 to 4.

Referring to the drawing, in Fig. 1, I have shown a refrigerator cabinet 10 provided with a motor and compressor unit arranged within a casing 11 and a condenser 12 surrounding the casing and spaced therefrom to permit circulation of air. The casing 11 enclosing the motor and compressor unit is mounted on a removable top 13 of the cabinet, and below this top in the chamber to be cooled within the cabinet is suspended an evaporator 14 of the flooded type. The evaporator is provided with a shelf 14a of aluminum, or other material of high thermal conductivity, for supporting freezing trays. Gaseous refrigerant is pumped by the compressor within the casing 11 into the condenser 12 where the refrigerant is liquefied and passes to a flow control device or float valve 15, from whence it flows in regulated quantities through the tube 16 to the evaporator 14. The refrigerant in the evaporator absorbs heat from the freezing trays and the interior of the cabinet 10, is vaporized and is withdrawn from the evaporator through a conduit 17, and returns to the compressor.

The normal operation of the compressor is controlled to maintain the evaporator 14 within a range of temperature, usually below freezing, by a switch housed within a casing 18 mounted on the top of the cabinet. In order to make the normal control responsive to the temperature of the evaporator a bulb 19 is secured to the evaporator and connected with an expansible bellows in the casing 18 by a tube 20. The bulb and tube are partially filled with a vaporizable liquid, the pressure of the vapor being changed by the change of temperature of the bulb, so as to actuate the bellows and open and close the normal control switch in a manner well known in the art. The arrangement thus far described comprises the usual compression type refrigerating system and control.

In accordance with my invention I provide an arrangement controlled by the temperature of the air in the refrigerator cabinet for defrosting the evaporator, and also for preventing freezing of the contents of the cabinet in the event of failure of the normal control. In the particular construction illustrated I employ an auxiliary control housed within a casing 21 arranged on top of the cabinet 10, and having a switch and thermostatic bulb 22 connected by a tube 23, which are partially filled with a vaporizable liquid, to operate an expansible bellows within the casing 21 in response to the temperature of the air within the cabinet 10. The end of the bulb 22 is supported on a bracket 24 within the cabinet and spaced from the wall thereof in the path of air circulating in the cabinet 10. Defrosting is accomplished by operating a lever 25 to interrupt the circuit of the compressor motor within the casing 11, and thus stop the supplying of refrigerant to the evaporator 14, which permits the temperature within the cabinet 10 to rise. When the air in the cabinet has reached a predetermined maximum temperature, say between 52° F. and 57° F., the auxiliary temperature-responsive device will operate to close the motor circuit and restore normal operation of the refrigerating system within the lower temperature limits determined by the setting of the control in the casing 18. The auxiliary control within the casing 21 is also arranged so that in the event the normal temperature-responsive device should fail to stop the supply of refrigerant to the evaporator at the lower end of the range of operating temperatures of the evaporator or should be set for too low a range of operating temperatures, the auxiliary control will open the motor circuit and stop operation of the motor to prevent further cooling. This feature is provided to prevent the freezing of food within the cabinet 10, which might result should the normal control mechanism fail to stop the operation of the compressor.

The arrangement of the motor circuit and the normal and defrosting controls is shown in Fig. 2, in which I have indicated a motor 26 having a squirrel-cage rotor 27, a main winding 28 and a starting winding 29. The winding 29 is connected in parallel with the main winding 28 during starting by a relay 30 which closes contacts 30ᵃ in response to the high-starting current and which drops out to open the contacts and deenergize the winding 29 when lower normal running current flows in the circuit. The motor 26 is connected to an alternating current source of supply through lines 31 and 32.

In this embodiment of my invention temperature-responsive control devices 33 and 34 are provided with contacts 35 and 36, respectively, connected in series with the line 31 of the motor circuit. The control device 33 is the normal control of the refrigerating system, which is arranged in the casing 18 shown in Fig. 1, and is responsive to the temperature of the evaporator, and the control 34 is the auxiliary or defrosting and low temperature safety control which is arranged in the casing 21, and is dependent upon and responsive to the temperature of the air within the cabinet 10. The contacts 36 may be opened at will by a mechanism including the lever 25, when it is desired to defrost the evaporator. In a refrigerating machine of the type shown in Fig. 1, the normal control is set to close contacts 35 when the evaporator temperature is about 22° F. or higher and to open the contacts when the temperature falls to about 12° F.; this maintains the cabinet air temperature at about 43° F. The auxiliary control 34 is set to open the contacts 36 when the cabinet air temperature falls below 32° F. and to close the contacts 36 when the cabinet air rises above a temperature of between 52° F. and 57° F. The lower temperature limit prevents freezing the food in the cabinet and the upper temperature limit is selected with a view to obtaining satisfactory defrosting of the evaporator without spoiling the food in the cabinet.

The normal control mechanism comprises a lever 37 pivoted to a stationary pin 38 and retained against an expansible bellows 39 by a compression spring 40. The force of the spring 40 may be adjusted to vary the temperature range of the control device so as to increase or decrease the freezing rate by turning a knob 41 which turns a screw 42 threaded into a cap 43 engaging the top of the spring. The bellows 39 is connected by tube 20 to the bulb 19 secured to the evaporator 14 and is, therefore, actuated in response to the temperature of the evaporator. Any movement of the bellows will produce movement of the lever, the amount of movement being determined by the pressure of the spring 40. Movement of the lever 37 is utilized to open and close the contacts 35. This is accomplished by connecting the lever 37 by an over-center spring mechanism to rotate an L-shaped lever 44 to which the upper contact of the pair of contacts 35 is secured by a flat spring 45, the lever being provided with a lug 46 pivoted about a stationary pin 47. The lever 44 and the spring 45 are arranged in the motor circuit. The over-center spring mechanism is arranged to rotate the lever 44 in a clockwise direction to close the contacts 35 with a snap action when a predetermined maximum temperature of the evaporator has been attained and to rotate the lever 44 in a counter-clockwise direction to open the contacts with a snap action when a predetermined minimum temperature of the evaporator has been reached. The maximum and minimum temperatures of the evaporator may be in the neighborhood of 12° F. and 22° F. respectively, these limits being such that the cabinet air temperature will range from about 42° F. to 44° F. in a well insulated cabinet of proper capacity. This over-center mechanism comprises a link 48 pivoted at 49 to a lug 50 secured to the end of the lever 37, and an over-center spring 51 connected at 52 to the link 48 and at 53 to a lug 54 secured to the right-hand end of lever 44. Upper and lower stops 55 and 56 respectively limit the movement of the link 48. It can readily be seen that when the pivot point 49 is moved upward by the lever 37 from the position shown in Fig. 2 it will pass the center line of the spring 51, which will then urge the connections at 52 and 53 toward each other and thus snap the link 48 against the lower stop 56 and at the same time snap the upper contact 35 against the lower contact 35 to close the motor circuit. When the mechanism is in the position shown, the counter-clockwise movement of lever 44 is limited by a stationary stop 57 at the upper end thereof.

A motor overload safety device is also provided. This device includes a lever 58 pivoted to a stationary pin 59 and urged in a counter-clockwise direction by a spring 60. Under normal conditions, with the contacts 35 closed and the motor running, the lever 58 is prevented from moving by a bar 61 engaging a star wheel 62 mounted on a stationary shaft 63 and secured to the shaft by a film of solder. However, when excessive current is drawn by the motor for too long a period of time, it will heat a resistor 64 in the line 32 of the motor circuit, and the heat will melt the film of solder and release the star wheel, whereupon the spring 60 will force the lever 44 toward the stop 57 to open the contacts 35. The spring 60 is sufficiently strong to overcome the force of the over-center spring 51. When the solder has cooled the lever 58 may be reset.

Referring further to Fig. 2, the defrosting or auxiliary control device 34 comprises a lever 65 pivoted to a stationary pin 66 and retained against an expansible bellows 67 by a compression spring 68. The force of the spring 68 may be adjusted to vary the temperature range of the control device by turning a threaded bolt 69 engaging a cap 70 arranged over the end of the spring 68. The bellows 67 is connected by the tube 23 to the bulb 22 and is therefore actuated in response to the temperature of the air within the chamber to be cooled. The upper contact 36 is secured by a flat spring 71a to an L-shaped lever 71 provided with a lug 72 pivoted on a stationary pin 73. The lever 65 is connected to actuate the lever 71 with snap action by an over-center spring mechanism like that of the normal control device 33. This mechanism comprises a link 74 pivoted at 75 to a lug 76 on the lever 65 and an overcenter spring 77 connected at 78 to the link 74 and at 79 to a lug 80 on the lever 71. I provide stops 81 and 82 to limit the upward and downward movements, respectively, of the link 74 and a stop 83 to limit the counter-clockwise rotation of the lever 71 about its pivot pin 73. The arrangement and operation of the device 34 thus far described are like that of the normal control device 33. The bellows 67 and the spring 68 are adjusted so that the contacts 36 will be closed when the temperature of the air in the cabinet rises to between 52° F. and 57° F. and will be opened when the temperature of the air is about 32° F. Should the contacts 35 of the normal control not open and the refrigerating system continue to operate or should the normal control be set for too low a cabinet temperature, the auxiliary control 34 will open the contacts 36 and stop the motor 26 which drives the compressor. As long as the normal control contacts 35 remain closed due to a fault or to a too low setting of the normal control temperature range, the refrigerating system will be controlled by the auxiliary control.

In order to defrost the evaporator at will I provide a manually operable device for opening the contacts 36 so that they will remain open until the temperature of the air in the cabinet has reached the upper operating temperature of the auxiliary control which will then close the contacts. This device includes the lever 25 which is pivoted on a stationary pin 84 and has a segment 85 secured to it on an extension 86. The lever 25 may be moved to either side, and centering springs 87 and 88 secured to stops 89 and 90 respectively are provided to bias the lever to its middle position. A pin 91 on the segment 85 is provided to engage the lower side of the link 74 when the lever 25 is moved to the right, and a pin 92 on the segment 85 is provided to engage the upper side of the link 74 when the lever is moved to the left. This construction is shown clearly in Fig. 4.

Should it be desired to defrost the evaporator, the lever 25 is moved to the right. If the contacts are closed, as shown in Fig. 2, the pin 91 will force the link 74 upward until the center line of the spring 77 passes the pivot point 75 when the spring 77 will open the contacts 36 with snap action, and will force the link 74 against the stop 81. The position of the mechanism after this operation is shown in Fig. 3, the dotted outline of the lever 25 indicating the position to which it was moved, it being understood that the lever is returned to its mid-position by the springs 87 and 88 when it is released by the operator. The control will remain in this position with the contacts open until the temperature of the air in the cabinet has risen to the upper temperature limit of the auxiliary control. I have found that if this limit is between 52° F. and 57° F. the evaporator will ordinarily have become satisfactorily defrosted. This air temperature is low enough to prevent spoiling of foods in the cabinet. When this upper temperature limit is reached the bellows 67 will urge the lever 65 upwardly and operate the over-center spring to close the contacts 36. When the contacts are closed the refrigerating system is placed again under control of the normal control device 33. Should the operator desire to restore the normal control of the system before the temperature of the air in the cabinet has reached the upper temperature limit of the auxiliary control, he can do so by moving the lever 25 to the left against the action of the spring 87, whereupon the pin 92 will urge the link 74 downward until the over-center spring 77 closes the contacts 36.

In Fig. 5 I have shown a curve representing the operating characteristics of the refrigerating system just described. In this curve the cabinet air temperature in degrees Fahrenheit is plotted against time in hours. The normal and defrosting cycles are shown and also the cycle of operation which obtains in the event the normal control contacts are frozen or otherwise prevented from opening the motor circuit. The normal cycle is represented as prevailing initially along the portion ABCD of the curve. During the normal operation the contacts 36 of the auxiliary control 34 are closed and the normal control 33 responsive to the evaporator temperature has complete control of the system. At point A the motor is started by the closing of the contacts 35 and the cabinet air is cooled along the curve AB; the motor is stopped at the point B and the evaporator is allowed to warm, thereby allowing the temperature of the cabinet air to increase along the curve BC, the motor being started again at the point C. This cycle is repeated as long as the refrigerating system is under the control of the normal control mechanism 33. The defrosting mechanism may be operated at will as has been explained above, the lever 25 being moved to the right to open the contacts 36. This operation may be performed when the refrigerating system is at any point in the normal cycle, and in Fig. 5 the defrosting cycle has been initiated at the point D when the air is being cooled after starting of the motor at the point C. The opening of the contacts 36 stops the motor and holds the contacts open while the temperature of the air rises along the curve DE. While the motor is stopped during the rise in temperature from D to E the evaporator is warmed sufficiently to become defrosted. At the point E which is the maximum temperature permissible, say 55° F. as determined by the auxiliary control 34, the auxiliary control will operate to close the contacts 36 and again start the motor 26. The cabinet air will then be cooled by operation of the evaporator, the temperature of the air decreasing along the curve EF. At the point F the normal control 33 will operate to open the contacts 35 and restore the normal cycle of operation as represented by the curve FGHI.

Should the contacts 35 become frozen or welded together, or should the control knob 41 be set for quick freezing or for continuous running and thereby hold the contacts 35 together even though the evaporator temperature should be abnormally low, the control of the refrigerating system will be taken over by the device 34; control of the system by the device 34 will continue as long as the contacts 35 are prevented from opening. Referring again to Fig. 5, the motor is started at the point I by closing the contacts 35. Should the contacts 35 now fail to open the motor will continue to operate and the cabinet air will be cooled along the curve IJ, the point J being at the temperature of 32° F. or somewhat higher. At the point J the control 34 will open the contacts 36 thereby stopping operation of the motor and preventing the lowering of the temperature of the cabinet air below freezing, thereby preventing the freezing of food placed within the cabinet. From the point J the cabinet air temperature will rise along the curve JK. At the point K the auxiliary control 34 will again start the motor, and the cabinet air will be cooled along the curve KL. If the contacts 35 are kept from opening the control 34 will continue to operate in a cycle between the temperatures JK. For purposes of illustration in Fig. 5 it is assumed that the control 33 becomes operative again and the contacts 35 open at the point L, thereby restoring the normal cycle of operation along the curve LMNO. The cycle of operation produced by the auxiliary control 34 and represented by the curve IJKL is obviously a defrosting cycle, the evaporator being defrosted during each cycle before the motor is again started. This defrosting cycle, while of too wide a range for normal refrigerator operation, will nevertheless prevent spoiling of the food by freezing or by too high a temperature.

As has been pointed out I provide a defrosting control which restores the system to normal operation dependent upon the temperature of the air in the cabinet to be cooled rather than upon the temperature of the evaporator to be defrosted. The temperature of the air in the cabinet is never allowed to rise sufficiently high to endanger the preservation of foods therein. Should there be too great a quantity of frost on the evaporator, normal operation may be resumed before all the frost has melted, but the system may be set to defrost again as soon as the cabinet air temperature has fallen below the predetermined control restoring value, and the remaining frost will then be melted. This is an advantage over defrosting systems operated in response to evaporator temperature wherein an excessive quantity of frost on the evaporator may result in too great a rise in cabinet air temperature while the frost is being completely melted. Under ordinary conditions the operator will set the control to defrost before an excess of ice is formed on the evaporator and my improved defrosting system will provide complete defrosting of the evaporator before the normal control is restored by the rise in temperature of the air in the cabinet.

It will be apparent from the foregoing that I have provided a simple and reliable mechanism whereby a refrigerating system may be defrosted and will automatically be restored to normal operation before any food is endangered by the increased temperature, and whereby freezing of food within the refrigerator is prevented even though the normal control contacts should become frozen together or the normal control be left too long at a low temperature setting for quick freezing of desserts and the like, or should for some other reason be set for too low a cabinet temperature.

While I have described a particular embodiment of my invention as applied to a household refrigerator, other modifications will occur to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States is:

1. A refrigerating system including a chamber to be cooled and an evaporator for cooling said chamber, means responsive to the temperature of said evaporator for normally maintaining the temperature of said evaporator below freezing, means independent of the temperature in said chamber for causing the temperature of said evaporator to rise above freezing to defrost the same, and means dependent upon the temperature of the air in said chamber at a substantial distance from said evaporator for causing the temperature of said evaporator to be again lowered below freezing.

2. A refrigerating system including a chamber to be cooled and an evaporator for cooling said chamber, means responsive to the temperature of said evaporator and controlling said system for maintaining said evaporator within a predetermined range of temperature below freezing, means for stopping the operation of said system to defrost said evaporator, and means dependent upon the temperature of the air in said chamber at a substantial distance from said evaporator and actuating an element of said defrosting means for restoring operation of said system in response to said control means to lower again the temperature of said evaporator below freezing.

3. A refrigerating system including a chamber to be cooled and an evaporator for cooling said chamber, means responsive to the temperature of said evaporator and controlling said system for maintaining said evaporator within a predetermined range of temperature below freezing, manually operable means for rendering said controlling means ineffective to control said system and for restoring effectiveness thereof, and means dependent upon the temperature of the air within said chamber at a substantial distance from said evaporator and cooperating with said manually operable means to actuate an element thereof for restoring effective operation of said controlling means.

4. A refrigerating system including a chamber to be cooled and an evaporator for cooling said chamber, means responsive to the temperature of said evaporator and controlling said system for maintaining said evaporator within a predetermined range of temperature below freezing, manually operable means including a lever biased to a central position for rendering said controlling means ineffective to control said system and for restoring effectiveness thereof, and means dependent upon the temperature of the air within said chamber at a substantial distance from said evaporator and cooperating with said manually operable means to actuate an element thereof for restoring effective operation of said controlling means.

5. A refrigerating system including a chamber to be cooled and an evaporator for cooling said chamber, means including a compressor and a condenser for supplying refrigerant to said evaporator, a motor for driving said compressor, a control circuit for said motor, means including a switch in said control circuit and controlling said motor for maintaining said evaporator within a predetermined range of temperature below freezing, manually operable means including a second switch in said control circuit for stopping said motor to defrost said evaporator, and means dependent upon a predetermined maximum temperature of the air in said chamber and cooperating with said manually operable means for closing said second switch to start again the operation of said motor.

6. A refrigerating system including a chamber to be cooled and an evaporator for cooling said chamber, means including a compressor and a condenser for supplying refrigerant to said evaporator, a motor for driving said compressor, a control circuit for said motor, means including a switch in said control circuit and controlling said motor for maintaining said evaporator within a predetermined range of temperature below freezing, means including a second switch having a link and an over-center spring and dependent upon a predetermined range of temperature of the air in said chamber for opening and closing said motor circuit, and manually operable means cooperating with said link for also opening and closing said second switch.

7. A refrigerating system including a chamber to be cooled, a cooling unit in said chamber, electrically controlled means for supplying refrigerant to said cooling unit, a control circuit for said refrigerant supplying means, means including a switch in said control circuit for maintaining said cooling unit within a predetermined range of temperature below freezing, means including a second switch in said control circuit for stopping said refrigerant supplying means to defrost said cooling unit, means responsive to temperature in said system and operable between two points over a wider predetermined range of temperature than said first mentioned control means for opening said second switch at one of said points and for closing said second switch at the other of said points, means dependent upon said temperature responsive means being in a position intermediate said two points for retaining said second switch closed and for retaining said second switch open, and means independent of said temperature responsive means for also opening said second switch to defrost said cooling unit and for again closing said second switch to lower the temperature of said cooling unit below freezing.

8. A refrigerating system including a chamber to be cooled, a cooling unit in said chamber, electrically controlled means for supplying refrigerant to said cooling unit, a control circuit for said refrigerant supplying means, means including a switch in said control circuit for maintaining said cooling unit within a predetermined range of temperature below freezing, means including a second switch in said control circuit for stopping said refrigerant supplying means to defrost said cooling unit, means responsive to temperature in said system and operable between two points over a wider predetermined range of temperature than said first mentioned control means for opening said second switch at one of said points and for closing said second switch at the other of said points, means including a snap-acting mechanism dependent upon said temperature responsive means being in a position intermediate said two points for retaining said second switch open and for retaining said second switch closed, and means biased to a middle position and cooperating with said snap-acting mechanism for also moving said second switch into either position thereof to initiate and terminate defrosting of said cooling unit.

9. An electrical control mechanism including relatively movable electrical contacts, temperature responsive means operable over a predetermined range between two points for moving said contacts to an open position at one of said points and for moving said contacts to a closed position at the other of said points, means dependent upon said temperature responsive means being in a position between said two points for retaining said contacts in said closed position and for retaining said contacts in said open position, and means independent of said temperature responsive means for also moving said retaining means to open said contacts and for moving said retaining means to close said contacts.

10. An electrical control mechanism including relatively movable electrical contacts, temperature responsive means operable over a predetermined range between two points for moving said contacts to an open position at one of said points and for moving said contacts to a closed position at the other of said points, means including a snap-acting mechanism and dependent upon said temperature responsive means being in a position intermediate said points for retaining said contacts in said closed position, and for retaining said contacts in said open position, and means biased to a central position and cooperating with said snap-acting mechanism for also moving said contacts into either position thereof.

11. A refrigerating system including a chamber to be cooled and an evaporator for cooling said chamber, means responsive to the temperature of said evaporator for normally maintaining the temperature of said evaporator below freezing, means independent of the temperature in said chamber for causing the temperature of said evaporator to rise above freezing to defrost the same, and means including a thermostatic bulb located at a substantial distance from said evaporator and responsive to the temperature of the air in said chamber for causing the temperature of said evaporator to be again lowered below freezing.

12. A refrigerating system including a chamber to be cooled and an evaporator for cooling said chamber, means including a temperature responsive element adjacent said evaporator for normally maintaining the temperature of said evaporator below freezing, means independent of the temperature in said chamber for causing the temperature of said evaporator to rise above freezing to defrost the same, and means including a second temperature responsive element located at a substantial distance from said evaporator and responsive to the temperature of the air in said chamber for causing the temperature of said evaporator to be again lowered below freezing.

13. A refrigerating system including a chamber to be cooled and an evaporator for cooling said chamber, means including a thermostatic bulb mounted on the surface of said evaporator for normally maintaining the temperature of said evaporator below freezing, means independent of the temperature in said chamber for causing the temperature of said evaporator to rise above freezing to defrost the same, and means including a second thermostatic bulb located at a substantial distance from said evaporator and responsive to the temperature of the air in said chamber for causing the temperature of said evaporator to be again lowered below freezing.

EDWARD R. FITZGERALD.